(12) United States Patent
Matono et al.

(10) Patent No.: US 8,233,767 B2
(45) Date of Patent: Jul. 31, 2012

(54) INFORMATION RECORDING APPARATUS

(75) Inventors: Haruki Matono, Fujisawa (JP);
Hiroyuki Marumori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1338 days.

(21) Appl. No.: 11/861,701

(22) Filed: Sep. 26, 2007

(65) Prior Publication Data

US 2008/0085100 A1  Apr. 10, 2008

(30) Foreign Application Priority Data

Oct. 6, 2006 (JP) .................................. 2006-274610

(51) Int. Cl.
*H04N 9/80* (2006.01)
*H04N 5/935* (2006.01)

(52) U.S. Cl. ........ 386/241; 386/210; 386/213; 386/239; 386/248; 386/250; 386/251

(58) Field of Classification Search .................. 386/210, 386/213, 239, 241, 248, 250, 251
See application file for complete search history.

(56) References Cited

U.S. PATENT DOCUMENTS

| | | | |
|---|---|---|---|
| 5,544,165 A | 8/1996 | Yokota et al. | |
| 5,848,032 A | 12/1998 | Yokota et al. | |
| 5,974,219 A * | 10/1999 | Fujita et al. | 386/290 |
| 7,072,901 B2 * | 7/2006 | Teraguchi et al. | 348/E5.067 |
| 7,450,820 B2 * | 11/2008 | Uenaka et al. | 386/239 |
| 7,489,853 B2 * | 2/2009 | Takahashi | 386/248 |
| 7,639,922 B2 * | 12/2009 | Saitoh et al. | 386/291 |
| 2004/0240841 A1 * | 12/2004 | Takagi et al. | 386/46 |
| 2005/0144164 A1 * | 6/2005 | Gorak et al. | 707/5 |
| 2005/0196140 A1 * | 9/2005 | Moteki | 386/52 |
| 2005/0259978 A1 | 11/2005 | Naitoh | |
| 2007/0031118 A1 * | 2/2007 | Fujishima et al. | 386/95 |

FOREIGN PATENT DOCUMENTS

| | | |
|---|---|---|
| JP | 09-073761 | 3/1997 |
| JP | 09-233374 * | 5/1997 |
| JP | 2003-069930 | 3/2003 |
| JP | 2004-120553 | 4/2004 |
| JP | 2004-319092 | 11/2004 |
| JP | 2005-251313 | 9/2005 |
| JP | 2005-293339 | 10/2005 |
| JP | 2006-053977 | 2/2006 |

\* cited by examiner

*Primary Examiner* — Daquan Zhao
(74) *Attorney, Agent, or Firm* — Antonelli, Terry, Stout & Kraus, LLP.

(57) ABSTRACT

One object of example embodiment is to provide arrangements for enabling a user to willfully record a highlight position and highlight importance without having to perform any burdensome procedure during highlight scene shooting. When a highlight button acquisition information and weight information input from a user interface 103 are acquired in a situation where a system control section 101 retains a predetermined time-shift time, the system control section 101 calculates marker information that includes the weight information and the information about a position earlier by the time-shift time, and records the marker information on a recording medium 105 via a drive control section 104.

10 Claims, 6 Drawing Sheets

FIG.6

| Marker 1 | Weight information | Address information |
|---|---|---|
| Marker 2 | Weight information | Address information |
| Marker 3 | Weight information | Address information |
| ⋮ | ⋮ | ⋮ |
| Marker N | Weight information | Address information |

INFORMATION RECORDING APPARATUS

PRIORITY CLAIM/INCORPORATION BY REFERENCE

The present application claims priority from Japanese patent application No. P2006-274610, filed 6 Oct. 2006, the entire contents of the above application(s) hereby being incorporated by reference into this application.

TECHNICAL FIELD

The present invention relates to an information recording apparatus, and more particularly, relates to marking in (i.e., indexing) audio/video data.

BACKGROUND ART

The background art for the present invention is disclosed, for instance, by Patent Documents 1 (Japanese Patent Laid-Open No. 2004-120553) and 2 (Japanese Patent Laid-open No. 2005-318180).

It is an object of the invention disclosed by Patent Document 1, to properly mark a video highlight scene that is desired by a user. In accomplishing the object, there is provided a recorder/player comprising: a brightness level detection section 21 for detecting the brightness level of a video signal; an audio level detection section 19 for detecting the audio level of an audio signal; an input section 25 for specifying the brightness level marking conditions for a video signal and/or the audio level marking conditions for an audio signal; a control section 23 for exercising control to mark a playback position when the detection results produced by the detection sections 19, 21 meet the marking conditions specified by the input section 25; a marking setup section 27 for outputting a marking signal in accordance with instructions from the control section 23; and a recording section 15 for recording the marking on a recording medium 31 in accordance with the marking signal.

It is an object of the invention disclosed by Patent Document 2 to automatically set a chapter at a user-desired position without user intervention for dubbing. In accomplishing such object, there is provided a method comprising the steps of: shooting a still image and inserting the shot still image into a desired position for chapter setup when a digital video camera is used for shooting; causing a hard disk recorder to compress video data with an MPEG encoder at a variable bit rate and record the video data on a hard disk when shot video is to be dubbed from the camera to the hard disk recorder; comparing the bit rate against a threshold value; when the bit rate is lower than the threshold value for a predetermined or longer period, judging that the video is a still image; and setting a chapter at a position of the still image.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. In the drawings, same or corresponding portions may be referenced by the same or similar reference numerals in order to eliminate redundant explanation.

The following represents brief descriptions of the drawings, wherein:

FIG. 6 is a data diagram that shows an example format of data recorded on a recording medium.

DETAILED DESCRIPTION

Figure 1:
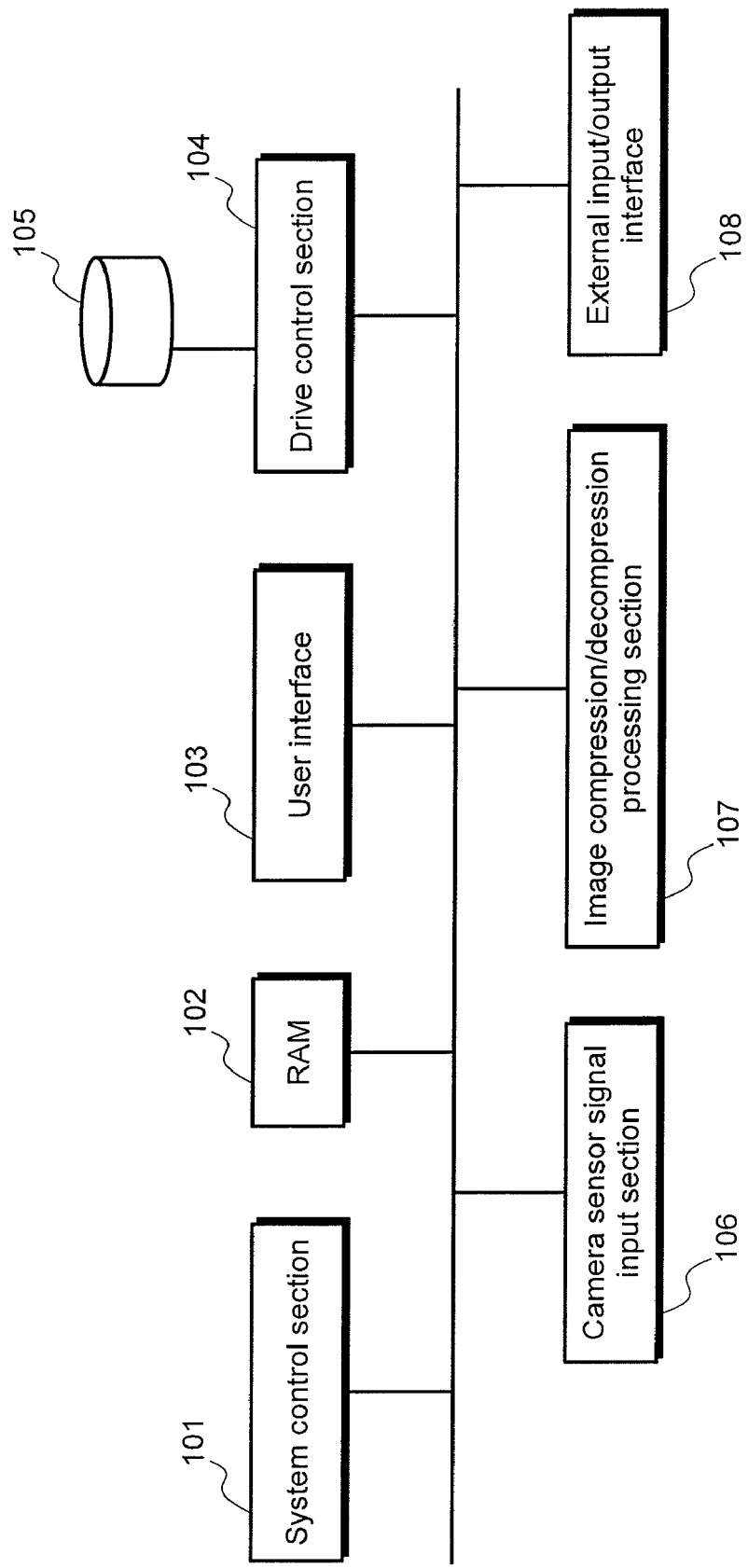
FIG. 1 is a block diagram illustrating an example configuration of an information recording/playback apparatus.

Before beginning a detailed description of the subject invention, mention of the following is in order. Clock and timing signal FIGS. are not drawn to scale, and instead, critical time values are mentioned when appropriate. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/ excessive detail. Multiple line (e.g., parallel) connections (including support components/circuitry) may be shown as a single line for simplicity of illustration and discussion, and so as not to obscure the invention. Arrowed or other interconnections shown between components may allow flow of information, etc. in a bi-directional manner. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although example embodiments of the present invention will be described using an example video camera, practice of the invention is not limited thereto, i.e., the invention may be able to be practiced with other types of electronic devices (e.g., cell phones), and in other types of environments.

Example embodiments of the present invention will now be described with reference to the accompanying drawings.

In this document, a audio/video scene contemplated or favored by the user is defined as a highlight scene, and playing back some or all highlight scenes is defined as digest playback.

Turning first to brief mention of problems to be solved, the invention disclosed by Patent Document 1 extracts a highlight scene from video and audio data. However, the highlight scene (or a user's favorite scene) varies from one user to another. User preferences greatly vary particularly when video is personally shot with a video camera. For example, users might want to use a scene in which their child appears from a group of many children as a highlight scene. In a situation where user preferences greatly vary as described above, it is difficult to automatically extract a highlight scene in accordance with video and audio data.

The invention disclosed by Patent Document 2 shoots a still image at a user-desired position. However, such a desired position cannot be marked unless a still image is shot timely when, for instance, a user's child appears or smiles. Further, if, for instance, a user presses a button in a hurry for quick marking, the video camera (information recording apparatus) body may shake, thereby blurring the shot video or making the recorded audio noisy.

Under the above circumstances, one object of the present invention is to provide an arrangement, for instance, for allowing the user to willfully record the position and importance of a highlight scene, even during shooting while keeping the highlight scene video undisturbed.

Another object of the present invention is to provide an arrangement, for instance, for extracting a plurality of highlight scenes from recorded video and playing back the extracted highlight scenes (digest playback).

To accomplish the above objects, a typical aspect of the present invention sets (i.e., backs-up) a marker at an earlier position when, for instance, a dedicated button is pressed a predetermined period of time after the user thinks that a highlight scene is encountered, and uses a recording medium to record weight information and marker address information in accordance with conditions prevailing at the time of a button press. At the time of playback, the weight information and address information can be used to provide digest playback.

As to advantages of the Invention, Applicant's invention enables the user, for instance, to efficiently index, record or view user-desired (i.e., highlight) scenes.

Other objects, means, and advantages of the present invention will become more apparent from the following detailed description of example embodiments of the present invention.

Turning now to discussion of a first embodiment, FIG. 1 shows an example configuration of a video camera as an example of an information recording apparatus for recording audio/video data (video data, image data, and audio data).

A system control section 101 has a CPU and a memory, and provides overall control over a system that includes the aforementioned blocks. A RAM (Random Access Memory) 102 is used as a temporary storage for storing video data and other large-size data or used as a storage for storing various control programs. A user interface 103 inputs an instruction that the user issues, for instance, by pressing a button. When data is to be recorded, a camera sensor signal input section (image pickup section) 106 passes an image signal to an image compression/decompression processing section 107. The video camera shown in FIG. 1 has a function for recording an externally input image signal as is the case with a stationary recorder, acquires an image signal from an external input/output interface 108, and passes data to the image compression/decompression processing section 107. Although an image signal flow is described above, the accompanying audio signal is also processed.

The image compression/decompression processing section 107 encodes video data by the MPEG (Moving Picture Experts Group), JPEG (Joint Photographic coding Experts Group), or other method. After being encoded by the image compression/decompression processing section 107, the video data is recorded onto a recording medium 105 by a drive control section 104. A DVD (Digital Versatile Disc), BD (Blu-ray Disc), HD (High Definition) DVD, hard disk, MD (Mini Disc), CD (Compact Disc), magnetic disk, semiconductor memory, or other recording medium capable of recording digital data may be used as the recording medium 105. At the time of playback, the video data recorded on the recording medium 105 is read by the drive control section 104 and decoded in a predetermined manner by the image compression/decompression processing section 107, to let the external input/output interface 108 output an image signal to a monitor or the like.

Figure 2:
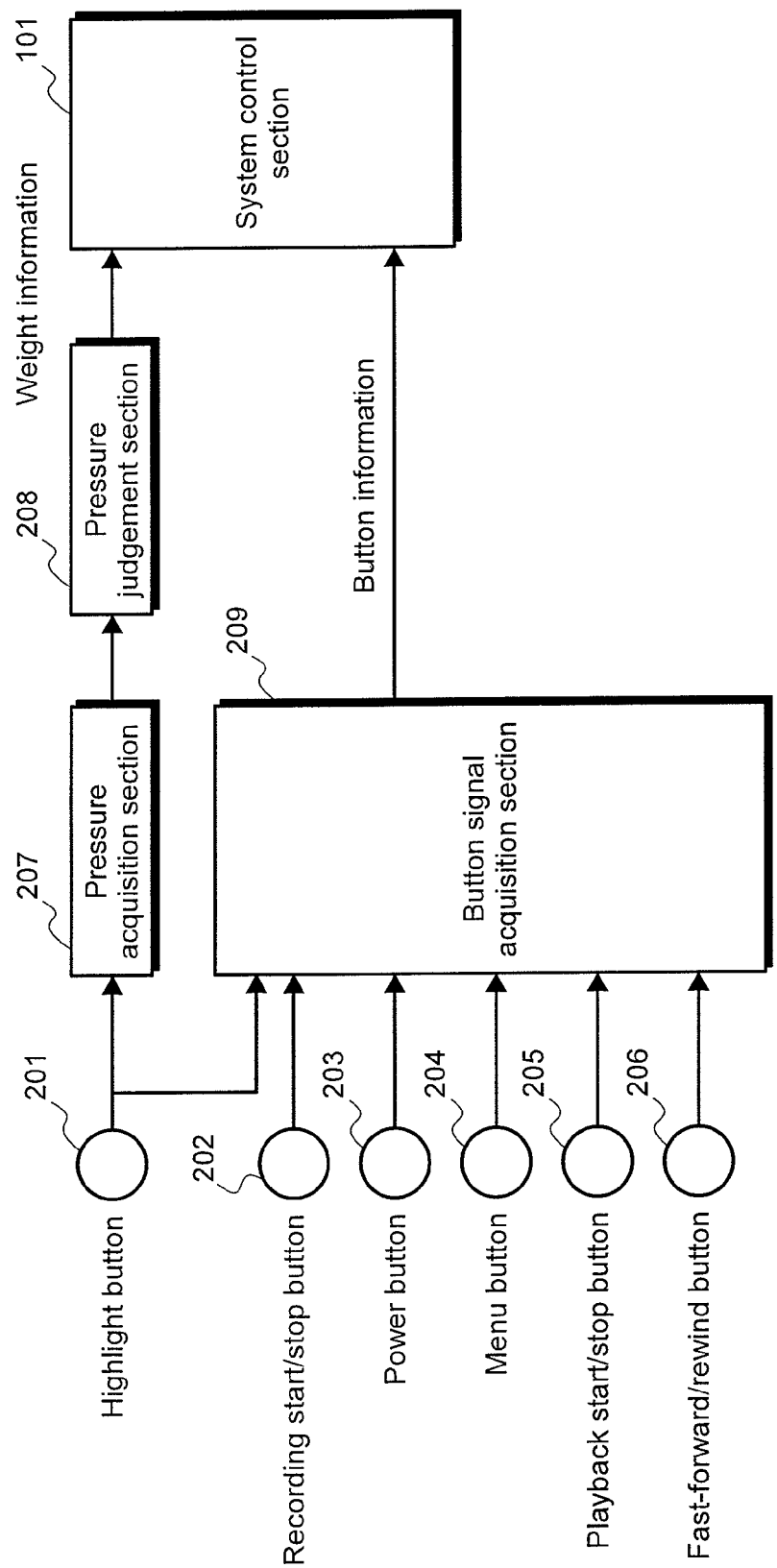
FIG. 2 is a block diagram illustrating an example configuration of a user interface.

FIG. 2 shows in detail an example of the user interface 103. A highlight button 201 delivers a signal to a button signal acquisition section 209, which determines whether the highlight button is pressed, and to a pressure acquisition section 207, which acquires the pressure applied to the highlight button. The signal acquired by the pressure acquisition section 207 is forwarded to a pressure judgment section 208. The pressure judgment section 208 compares the signal against a predefined level for judgment purposes. The obtained judgment result is output to the system control section 101 as weight information.

When a power button 203 is pressed, the button signal acquisition section 209 detects that the power button 203 is pressed, and turns on the power. When a recording start/stop button 202 is pressed for recording purposes, the button signal acquisition section 209 detects that the recording start/stop button 202 is pressed, and notifies the system control section 101, which is shown in FIG. 1 and FIG. 2, that the recording start/stop button 202 is pressed. A recording process then starts. A second press of the recording start/stop button 202 brings the recording process to a stop. Similarly, a playback start/stop button 205 is pressed to play back recorded video data, and pressed again to stop a playback process.

The user interface 103 also includes a menu button 204, which opens a menu screen, and a fast-forward/rewind button 206, which performs a fast forward or rewind operation. The user interface 103 may also include cursor buttons for selecting displayed thumbnails or menu items, zoom buttons for zooming in or zooming out on a shot image, a finalize button for finalizing a DVD-R or other disc, and a dubbing button for moving or copying data between a plurality of recording media within the video camera or from a recording medium in the video camera to a recording medium in an external apparatus.

Button depression results are output to the system control section 101 as button information.

Figure 3:
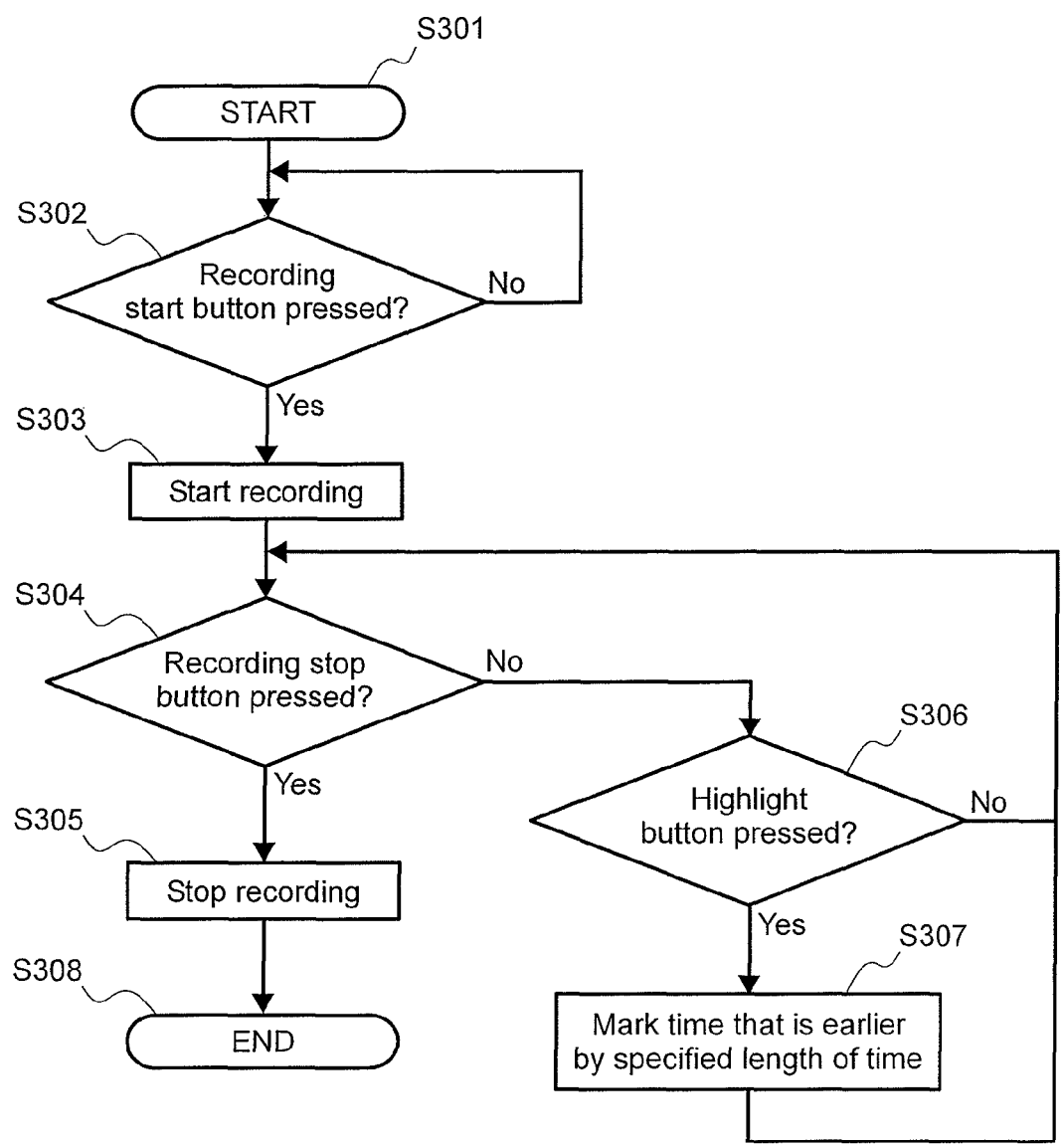
FIG. 3 is a flowchart illustrating an example process that is performed when a highlight button is operated.

FIG. 3 shows an example operation that the video camera, particularly the system control section 101, performs when the highlight button 201 is pressed.

A case where the user starts recording video data onto a recording medium will now be described. More particularly, step S301 represents a start.

Step S302 is performed to judge whether the recording start button 202 is pressed by the user. If not pressed, operations loop back to repeat S302. When the obtained judgment result indicates that the recording start button 202 is pressed, processing proceeds to step S303.

In step S303, a recording start process is performed so that the drive control section 104 starts recording video data onto a recording medium.

Next, step S304 is performed to judge whether the recording stop button 202 is pressed. If the obtained judgment result does not indicate that the recording stop button 202 is pressed, processing proceeds to step S306. If, on the other hand, the obtained judgment result indicates that the recording stop button 202 is pressed, processing proceeds to step S305, and operations end S308.

Step S306 is performed to judge whether the highlight button 201 is pressed. If the obtained judgment result does not indicate that the highlight button 201 is pressed, processing returns to step S304. If, on the other hand, the judgment result indicates that the highlight button 201 is pressed, processing proceeds to step S307.

In step S307, a marker is set at a video data position that is earlier than the press of the highlight button 201 by a predetermined length of time. This marker setup sequence will be described with reference to FIG. 4.

When a recording process begins, the user shoots scenes which may contain a highlight scene (e.g., within a range of frames 2-6). If the user presses the highlight button 201 at time t2, which is later than the end of the highlight scene, while shooting a scene (even without pressing the recording stop button 202), a marker is set at time t1, which is earlier than time t2 by a predetermined time-shift time Δt. Therefore, the user can devote himself/herself to the shooting of the highlight scene and conveniently mark the highlight scene casually without fail while continuing with shooting, i.e., a user is not under stress to try to index a highlight scene the exact instance it happens. For example, the user might want to mark a highlight scene while shooting various scenes in a situation where a child of the user performs on stage on a parents' day at a kindergarten school. Since the parent has never seen the performance before, the parent cannot be sure of when a highlight scene may occur with respect to his/her own child. The user can mark a highlight scene, in which the child of the user is highlighted a few seconds after a highlight happens, while properly shooting the whole performance of the day.

Further, if the pressure acquisition section 207 coordinates with the highlight button 201, step S306 is also performed to judge, as one example, whether the highlight button 201 is pressed strongly or gently by the user. When the button is pressed strongly, for example, the user has recognized that the importance of the scene is high. When, on the other hand, the button is pressed gently, for example, the user has recognized that the importance of the scene is low. In accordance with the user's judgment, the degree of importance of the scene can be set as weight information together with marker position information.

As another example, a timer may be employed in addition to, or in place of, the pressure acquisition section 207 and used to judge the degree of importance by the length of time during which the highlight button 201 is pressed. Further, a plurality of highlight buttons 201 may be employed so as to set the amount of weight (the degree of importance) in accordance with a pressed button. The amount of weight may also be specified after the press of the highlight button 201.

A button existing on the apparatus may be used as the highlight button (as opposed to a dedicated highlight button). For example, it may be possible to set a marker by pressing the playback start/stop button 205, which is not used during recording. Further, a marker can be set as other examples, by gently pressing an existing button, pressing an existing button two times in succession, or performing any other peculiar operating procedure. The procedure for setting a marker is not limited to those mentioned above.

It goes without saying that a marker can be set by manipulating a remote controller instead of pressing a button. A marker can also be set by using a combination of the above-mentioned procedures. It is preferred that the user be allowed to change the amount of weight after performing a marker setup procedure.

As described earlier, the degree of scene importance can be set in accordance, for instance, with the pressure applied to a button. However, enhanced user friendliness is provided if particular information (e.g., scene classification) is set together with marker position information in accordance with the pressured applied to a button and without regard to the degree of scene importance, which is judged by the user.

As shown in FIG. 6, marker number information which indicates a marker number, weight information which indicates the degree of highlight importance, and address information which indicates the position of a highlight scene marker, may be recorded on a recording medium.

When, for instance, the information shown in FIG. 6 is to be recorded onto a DVD, it may be recorded in a format unique to the video camera without regard to the VF or VR format. In such an instance, however, markers might be lost when data is dubbed from the video camera to an external apparatus (e.g., a stationary DVD recorder). In such a situation, a function for editing a marker as a scene (chapter) separation position may be incorporated. In this case, the video remains uninterrupted irrespective of scene changes unlike during a shooting period. It is preferred that the user be allowed to choose whether or not to use the above function. The same holds true for a finalizing process on a DVD-R or other disc as it does for dubbing.

If markers are defined by a format, the necessity for making changes at the time of dubbing or the like can be obviated by complying with the format. If, for instance, the DVD VR format is employed, the separators for chapters, which are subordinate to a title set or a title, can be used as markers as far as the title set or the title corresponds to one scene. If the BD format is used, a playlist mark can be used as a marker as far as a play item within a playlist corresponds to one scene.

Figure 4:
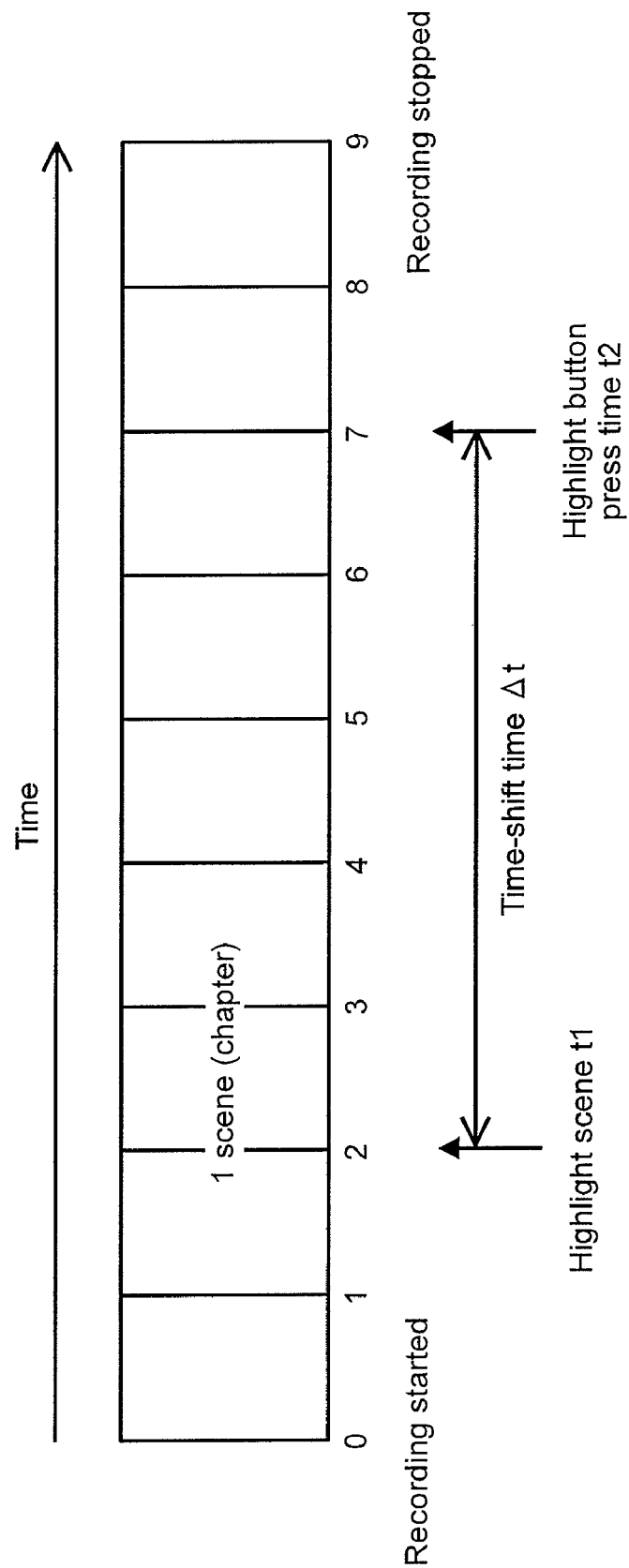
FIG. 4 is a conceptual diagram that shows an example marker setup example according to an example first embodiment.

FIG. 4 shows an example relationship among video data, marker, and time that prevails when the highlight button 201 is pressed once while a scene is recorded. That is, during the time interval between the instant at which the recording start button 202 is pressed and the instant at which the recording stop button 202 is pressed, is shown as frames 0-9. FIG. 4 schematically shows the relationship between recorded video data and marker, while time is plotted along the horizontal axis.

When the highlight button 201 is pressed at time t2 in a situation where scene recording began at time 0, a highlight scene marker is set at a position t1 that is earlier than time t2 by Δt. It is assumed that the recording stop button 202 was pressed at time frame 9, which is later than time t2. It should be noted the invention is not limited to one index per scene, and that a plurality of highlight scenes can be set within a single scene.

The time-shift time Δt can be determined, for example, by different methods.

A first example method is to store the time-shift time Δt, for instance, in the system control section 101 or RAM 102 in advance, and allow the system control section 101 to use the stored time-shift time Δt. Enhanced user friendliness is provided if the time-shift time Δt stored in the RAM 102 or the like can be set or changed by the user, for instance, from a menu screen that is provided by the user interface 103. If the user wants to specify the marker position a certain period of time after (i.e., farther away from) a highlight scene position, the user can set a relatively long time-shift time Δt. If, on the other hand, the user wants to set a marker position immediately after (i.e., closer to) a highlight scene position is encountered, the user can set a relatively short time-shift time Δt.

A second example method is to send an inquiry to the user when the highlight button 201 is pressed. When the highlight button 201 is pressed, the monitor screen displays a message, for instance, to ask whether the user wants to set a 5-second-old scene as a highlight scene. The user can switch from 5 seconds to a desired number of seconds or minutes by manipulating, for instance, a cursor button that is not shown in FIG. 2. One example is that the user be allowed to change the default value (5 seconds).

One example alternative would be to cause the monitor to display a 5-second-old thumbnail as a picture-in-picture or within a window, display a message to ask whether the user wants to set the displayed scene as a highlight scene, and allow the user to change the displayed scene in forward and backward directions in the unit of a predetermined length of time (e.g., in 1-second units) with a cursor button or other button that is not shown in FIG. 2 and set a user-desired highlight scene. When compared to the method of specifying the number of seconds or minutes, the above method provides enhanced user friendliness because it allows the user to visually confirm the selected highlight scene. Examples are that the user be allowed to change the default value (5 seconds) and change unit (1 second) in advance.

The length of a highlight scene is not fixed. Therefore, the use of the second method makes it possible to accurately select a user-desired position. However, the user may be continuing with scene shooting subsequently to the highlight scene. If an inquiry message appears on the display during shooting due to the use of the second method, as one disadvantage, the user might fail to concentrate on shooting. The first method would be effective if it is anticipated that the user might fail to concentrate on shooting. The user may be allowed to choose between the above two methods.

Further, provision may be made so that the time-shift time Δt cannot be defined so as to move beyond a target scene. For example, FIG. 4 indicates that time t2 (at which the highlight button was pressed) is close to time frame 7. Therefore, if the value Δt is 8 frames, a marker may be mistakenly set for the preceding scene (i.e., to a scene pre-dating the time 0). To avoid such a problem, the value Δt should be limited so that the user can specify a highlight scene only within the target scene.

If, for instance, the employed method sends an inquiry to the user when the highlight button 201 is pressed, the upper limit for the value Δt may be limited, for example, to a period between t2 and scene start time. As one example, if a predefined default value for Δt is outside a period between t2 and scene start time, the value Δt may be made equal to a period between t2 and scene start time (that is, the marker is set at the scene start time (t=0), which is the beginning of a scene, and the starting scene is set as a highlight scene). As another alternative, the value Δt may be decreased by a predetermined amount (e.g., reduced to half the predefined default value for Δt).

Discussion turns next to a second example embodiment. The first embodiment assumes that the time-shift time Δt is predetermined or user-selectable. However, a second embodiment uses an example automatic detection function for automatically detecting a particular scene so that a marker is set for a highlight scene even when the highlight button 201 is pressed tardily. The second embodiment assumes that the automatic detection function for automatically detecting a particular scene can be used. For example, the function for identifying a scene in accordance with image brightness or audio level as indicated in Patent Document 1 may be used to automatically detect a particular scene. The same descriptions as those in the first embodiment are omitted in the following discussions for sake of brevity.

Figure 5:
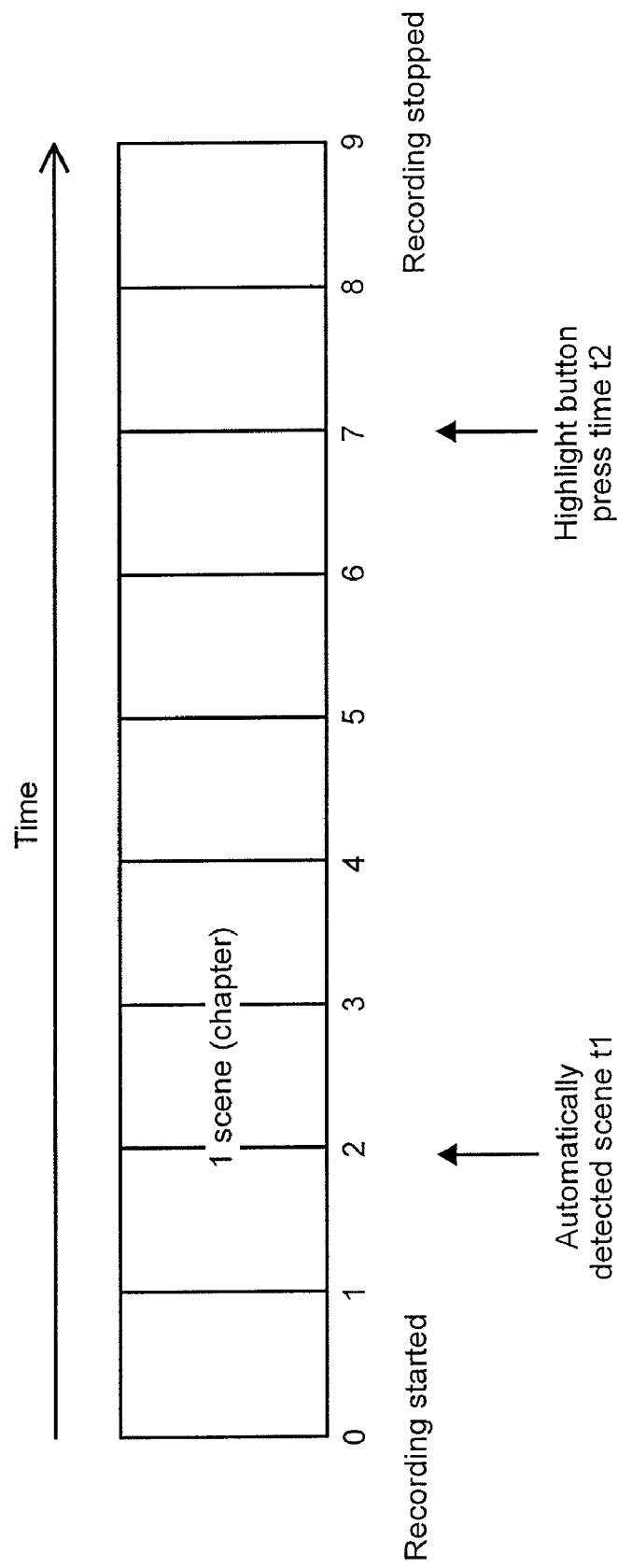
FIG. 5 is a conceptual diagram that shows an example marker setup example according to an example second embodiment.

FIG. 5 shows an example relationship among video data, marker, and time that prevails when the highlight button 201 is pressed once while a scene is recorded, that is, during the time interval between the instant at which the recording start button 202 is pressed and the instant at which the recording stop button 202 is pressed. FIG. 5 schematically shows the relationship between recorded video data and marker while time is plotted along the horizontal axis.

A first example method is to activate the automatic detection function while a scene is being shot, detect from the currently shot video a scene in which, for instance, an unduly high audio level is detected by the automatic detection function (e.g., a scene in which hands are clapped), and display, for instance, the message "Highlight" or "Highlight scene candidate extracted" on the monitor for notification purposes. The notification method is not specifically limited to such example. An alternative notification method would be to illuminate a lamp on the video camera body or vibrate the video camera housing. In this instance, even when the user presses the highlight button at time t2, which is later than time t1 at which a highlight scene was automatically detected, a highlight scene indicating marker is set at t1 position. That is, when a user depresses the highlight button at time t2, the marker (or index) is set at a highlight scene change which immediately precedes time t2. Such highlight scene change may have been detected at a plurality of different possible times before the highlight button depression by the user.

The arrangement may include a memory which stores time-shift information about a time interval between a scene recorded at the time of instruction reception and a scene that is to be marked with a marker. For example, when the arrangement automatically extracts a potential highlight scene (e.g., by a sudden change in brightness or sound level), the arrangement may start a timer and keep the timer value stored within the memory as the time-shift information. Once the user depresses the highlight button, the arrangement may set a marker by using the time-shift information in the memory.

When only the highlight scene automatic detection function is used (without highlight button depression by the user), the scene extracted by the video camera does not always coincide with a user-defined highlight scene. However, the use of this first method enables the user to select a scene from scenes extracted by the video camera and put a highlight mark on the selected scene during shooting. Further, when this first example method is used in conjunction with the first embodiment, better results are produced because the user can choose to designate a highlight scene during shooting even when it cannot be extracted by the video camera.

When the user encounters a highlight scene while a scene is being shot and presses the highlight button 201 at time t2, which is later than the highlight scene, a second method exercises a particular scene automatic detection function to extract a particular scene from the video that was shot before time t2. The extracted particular scene may be recorded as is as a highlight scene as indicated in FIG. 6.

An alternative would be to display a thumbnail of the extracted particular scene as a picture-in-picture on the monitor, prompt the user to verify the displayed scene, and record the displayed scene as a highlight scene when it is verified by the user. The particular scene automatic detection function may be activated after the press of the highlight button 201 or activated in advance to extract a particular scene at the press of the highlight button 201. An alternative is to extract a particular scene in advance and display it at the press of the highlight button 201.

The range of particular scene automatic detection may begin with the beginning of a scene, or may be a period between the instant (time t1) at which the highlight button 201 was pressed and the instant that is earlier than time t2 by a predetermined length of time (e.g., the instant that is 10 seconds earlier than time t2 and within the scene).

Further, a pressure sensor can be used as described in conjunction with the first embodiment to judge whether the highlight button 201 is pressed strongly or gently by the user. When the button is pressed strongly, the user has recognized that the importance of the automatically detected highlight scene t1 is high. When, on the other hand, the button is pressed gently, the user has recognized that the importance of the scene is low. In accordance with the user's judgment, the degree of importance of the scene can be set as weight information together with marker position information.

Finally, the method of playing back a scene for which a marker is set in accordance with the first or second embodiment will be described.

When the degree of importance (weight information) is used as described above, an importance threshold value for playback is set (e.g., by user input) before playback.

When a comparison between the threshold value and weight information reveals that the weight information is greater than the threshold value, the associated marker is validated to start a digest playback operation.

A typical digest playback operation may be performed to play back a portion close to the marker for several tens of seconds and then play back a portion close to the next marker. However, the present invention is not limited to the use of such a digest playback method.

When the time for setting a marker (e.g., the time for pressing the highlight button) differs from the time for which the marker is to be set, as described above, it is possible to concentrate on shooting a highlight scene. Further, since no special marker setup procedure needs to be performed while shooting the highlight scene, it is possible to avoid an image blur during highlight scene shooting, e.g., by camera movement due to button depression.

Furthermore, since a highlight scene can be set during shooting, it is possible to avoid or reduce the trouble of performing edits at a later date, and perform an operation immediately after shooting while the user's impression is vivid. As the user presses the highlight button after the highlight scene to be set was encountered, the user knows about the contents of the highlight scene. Therefore, the user can specify the degree of highlight scene (marker) importance. In other words, since the marker setup time is later than the time at which the highlight scene was encountered, the user can record information during shooting to define how important the marked scene is for the user. Since the recorded information can be used as the weight information for digest playback, the user can perform an intended digest playback operation and efficiently view the shot video data.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: cameras, cell phones, computing machines, non-computing machines, communication machines, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other form of propagated signals (e.g., carrier waves, infrared signals, digital signals); etc., existing on a tangible carrier component.

Method embodiments may be emulated as apparatus embodiments (e.g., as a physical apparatus constructed in a manner effecting the method); apparatus embodiments may be emulated as method embodiments.

In beginning to conclude, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc. Further, unless indicated otherwise, any of the specific procedures may be effected in real-time during operation of any apparatus and/or method.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

The invention claimed is:

1. An information recording apparatus comprising:
a recording section for recording audio/video data externally input;
a marker setup instruction section for receiving an instruction from a user, for setting a marker in the audio/video data;
a control section which, if the marker setup instruction section receives the instruction from the user while the recording section is recording audio/video data, sets the marker at a location corresponding to a scene within the audio/video data that occurred earlier in time than a time of instruction reception for setting the marker;

a memory which stores time-shift information, which can be set or changed by the user through a user interface, setting a time interval between a scene recorded at the time of instruction reception and a scene that is to be marked with a marker, wherein the control section sets a marker by using the time-shift information in the memory; and a display section for displaying the audio/video data to be recorded, wherein the control section causes the display section to display the number of time-shift seconds or minutes in accordance with the time-shift information in the memory.

2. The information recording apparatus according to claim 1, comprising:

a judging section for judging whether a time of going back during the time interval identified by the time-shift information from the time of instruction reception, is earlier than a recording start time, wherein the control section sets the marker at a position corresponding to the recording start time, when a result of judgment indicates that the data position corresponding to time that is earlier than the time of instruction reception, is earlier than the recording start time.

3. An information recording apparatus comprising:

a recording section for recording audio/video data externally input;

a marker setup instruction section for receiving an instruction from a user, for setting a marker in the audio/video data;

a control section which, if the marker setup instruction section receives the instruction from the user while the recording section is recording audio/video data, sets the marker at a location corresponding to a scene within the audio/video data that occurred earlier in time than a time of instruction reception for setting the marker;

a memory which stores time-shift information, which can be set or changed by the user through a user interface, setting a time interval between a scene recorded at the time of instruction reception and a scene that is to be marked with a marker, wherein the control section sets a marker by using the time-shift information in the memory; and a display section for displaying the audio/video data to be recorded, wherein the control section extracts a scene that occurred earlier in time than the time of instruction reception by the time-shift information in the memory, and displays the extracted scene on the display section.

4. The information recording apparatus according to claim 3, comprising:

a scene change instruction section for receiving an instruction from the user, for switching from a scene displayed on the display section to a preceding or succeeding scene, wherein the control section sets the marker at a scene that is newly selected by the scene change instruction section and verified by the user.

5. The information recording apparatus according to claim 3, comprising:

a judging section for judging whether a time of going back during the time interval identified by the time-shift information from the time of instruction reception, is earlier than a recording start time, wherein the control section sets the marker at a position corresponding to the recording start time, when a result of judgment indicates that the data position corresponding to time that is earlier than the time of instruction reception, is earlier than the recording start time.

6. An information recording method comprising:

recording audio/video data externally input onto a recording medium;

receiving an instruction from a user, for setting a marker in the audio/video data;

setting, if the receiving operation receives the instruction from the user while the recording operation is recording audio/video data, the marker at a location corresponding to a scene within the audio/video data that occurred earlier in time than a time of instruction reception for setting the marker;

storing time-shift information, which can be set or changed by the user through a user interface, setting a time interval between a scene recorded at the time of instruction reception and a scene that is to be marked with a marker, wherein a control section sets a marker by using the time-shift information; and displaying the audio/video data to be recorded, wherein the control section causes the display section to display the number of time-shift seconds or minutes, in accordance with the time-shift information.

7. The information recording method according to claim 6, comprising judging whether a time of going back during the time interval identified by the time-shift information from the time of instruction reception, is earlier than a recording start time; and setting a marker at a position corresponding to the recording start time when a result of judgment indicates that the data position corresponding to time that is earlier than the time of instruction reception, is earlier than the recording start time.

8. An information recording method comprising:

recording audio/video data externally input onto a recording medium;

receiving an instruction from a user, for setting a marker in the audio/video data;

setting, if the receiving operation receives the instruction from the user while the recording operation is recording audio/video data, the marker at a location corresponding to a scene within the audio/video data that occurred earlier in time than a time of instruction reception for setting the marker;

storing time-shift information, which can be set or changed by the user through a user interface, about a time interval between a scene recorded at the time of instruction reception and a scene that is to be marked with a marker, wherein a control section sets a marker by using the time-shift information; and displaying the audio/video data to be recorded, wherein the control section extracts a scene that occurred earlier than the time of instruction reception by the time-shift information, and displays the extracted scene on the display section.

9. The information recording method according to claim 8, comprising:

receiving an instruction from a user, for switching from a scene displayed to a preceding or succeeding scene, wherein the control section sets the marker at a scene that is newly selected and verified by the user.

10. The information recording method according to claim 8, comprising judging whether a time of going back during the time interval identified by the time-shift information from the time of instruction reception, is earlier than a recording start time; and setting a marker at a position corresponding to the recording start time when a result of judgment indicates that the data position corresponding to time that is earlier than the time of instruction reception, is earlier than the recording start time.

* * * * *